(12) United States Patent
Leefken et al.

(10) Patent No.: US 10,565,340 B2
(45) Date of Patent: *Feb. 18, 2020

(54) FIELD-EFFECT TRANSISTOR PLACEMENT OPTIMIZATION FOR IMPROVED LEAF CELL ROUTABILITY

(71) Applicant: International Business Machines Corporation, Armonk, NY (US)

(72) Inventors: Iris Maria Leefken, Dettenhausen (DE); Silke Penth, Holzgerlingen (DE); Michael Stetter, Neuweiler (DE); Tobias T. Werner, Weil im Schoenbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,619

(22) Filed: Nov. 14, 2017

(65) Prior Publication Data

US 2018/0322236 A1    Nov. 8, 2018

Related U.S. Application Data

(63) Continuation of application No. 15/586,851, filed on May 4, 2017, now Pat. No. 10,394,994.

(51) Int. Cl.
*G06F 17/50*    (2006.01)

(52) U.S. Cl.
CPC ...... *G06F 17/5072* (2013.01); *G06F 17/5068* (2013.01); *G06F 17/5077* (2013.01); *G06F 2217/06* (2013.01)

(58) Field of Classification Search
CPC ............ G06F 17/5072; G06F 17/5068; G06F 17/5077; G06F 17/5045; G06F 11/261; G06F 17/5022; G06F 17/505; G06F 2217/84; G06F 2217/06; G06F 17/50; G01R 31/31704; G01R 31/318357; G01R 31/318335

(Continued)

(56) References Cited

U.S. PATENT DOCUMENTS 5,701,255 A   12/1997   Fukui
5,984,510 A   11/1999   Guruswamy et al.

(Continued)

OTHER PUBLICATIONS

List of IBM Patents or Patent Applications Treated as Related; (Appendix P), Filed Nov. 14, 2017, 2 pages.

(Continued)

*Primary Examiner* — Binh C Tat
(74) *Attorney, Agent, or Firm* — Cantor Colburn LLP; Margaret McNamara

(57) ABSTRACT

A processor-implemented method for automatically generating a layout of a cell of a semiconductor circuit is provided herein. The processor-implemented method includes reading a netlist of the cell. The netlist includes a description of internal electrical nets connecting electrical components of the cell with each other. The processor-implemented method assigning a weight to an internal net of the internal electrical nets and placing the electrical components in an area of the semiconductor circuit based on the netlist and the weight to generate the layout of the cell of the semiconductor circuit.

3 Claims, 5 Drawing Sheets

(58) Field of Classification Search
USPC .................................................. 716/118–125
See application file for complete search history.

(56) References Cited

U.S. PATENT DOCUMENTS

| | | |
|---|---|---|
| 7,120,888 B2 | 10/2006 | Curtin et al. |
| 8,782,584 B2 | 7/2014 | Alpert et al. |
| 8,949,760 B2 | 2/2015 | Birch et al. |
| 2006/0031802 A1* | 2/2006 | Alpert ................ G06F 17/5072 716/123 |
| 2007/0150846 A1* | 6/2007 | Furnish .............. G06F 17/5068 716/122 |
| 2009/0044163 A1 | 2/2009 | Wang et al. |
| 2010/0083207 A1 | 4/2010 | Kobayashi |
| 2012/0266124 A1* | 10/2012 | Alpert ................ G06F 17/5072 716/122 |
| 2013/0212549 A1 | 8/2013 | Maziasz et al. |
| 2013/0339914 A1 | 12/2013 | Vrudhula et al. |
| 2014/0109034 A1 | 4/2014 | Van Ginneken et al. |

OTHER PUBLICATIONS

Iris Maria Leefken et al., "Field-Effect Transistor Placement Optimization for Improved Leaf Cell Routability", U.S. Appl. No. 15/586,851, filed May 4, 2017.
Hougardy et al.; "Bonncell Automatic Layout of Leaf Cells"; Research Institute for Discrete Mathematics; University of Bonn; Jan. 24, 2013; pp. 1-40.
Hougardy et al.; "Bonncell: Automatic Layout of Leaf Cells"; 18th Asia and South Pacific Design Automation Conference (ASPDAC); 2013; pp. 453-460.
Schneider et al.; "Transistor-Level Layout of Integrated Circuits"; Bonn; May 2014; pp. 1-162.

\* cited by examiner

FIELD-EFFECT TRANSISTOR PLACEMENT OPTIMIZATION FOR IMPROVED LEAF CELL ROUTABILITY

DOMESTIC BENEFIT/NATIONAL STAGE INFORMATION

This application is a continuation application of U.S. application Ser. No. 15/586,851, which was filed on May 4, 2017. The entire disclosures of U.S. application Ser. No. 15/586,851 are incorporated herein by reference.

BACKGROUND

The disclosure relates generally to improved routability of transistor placements, and more specifically, to field-effect transistor placement optimization for improved leaf cell routability.

In general, a topology of a chip includes a level hierarchy, usually nine to ten levels, which are built up from a first level (e.g., lowest negative metal-oxide-semiconductor (NMOS)/positive MOS (PMOS) level) by grouping cells of the previous level as the level hierarchy is ascended. Focusing on a second level of the level hierarchy, which can be referred to as a leaf cell level, NMOS/PMOS transistors of the first level are grouped within networks or nets. When planning a placement of the leaf cell level, competing placement requirements, such as area, interconnection length (which equates to timing), limited metal resources, electro-migration requirements, and external connection requirements, dictate the leaf cell level layout. Further, an area of the chip itself is a critical feature that relies on an efficient leaf cell layout and routability of this layout.

Presently, leaf cell level layout implementation is a bottleneck for bringing a chip to market. The bottleneck results partly from, when building a chip, some special circuits (e.g. dynamic logic in a static random access memory (SRAM) cannot be mapped to logic gates (e.g., NAND, NOR . . . ) from standard libraries. Conventional leaf layout generators automate the leaf cell level layout implementation to alleviate this bottleneck; however, conventional leaf layout generators fail to address issues, such as when the tightest placements are not routable and when advanced technology nodes pose more and more design constraints.

SUMMARY

According to one or more embodiments, a processor-implemented method for automatically generating a layout of a cell of a semiconductor circuit is provided herein. The processor-implemented method includes reading a netlist of the cell. The netlist includes a description of internal electrical nets connecting electrical components of the cell with each other. The processor-implemented method assigning an exclusive internal weight to an internal net of the internal electrical nets and placing the electrical components in an area of the semiconductor circuit based on the netlist and the weight to generate the layout of the cell of the semiconductor circuit.

According to one or more embodiments, the processor-implemented method can be implemented as a computer program product and/or a system.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include a system, method, and/or computer program product (herein a system) that improves leaf cell routability and/or adjusts transistor placement to achieve better routability of a leaf cell. Thus, embodiments described herein are necessarily rooted in a processor of a computing system to perform proactive operations to overcome problems specifically arising in the realm of level hierarchy of chip topology (e.g., these problems include a failure to balance competing placement requirements, resulting in unwanted delays, costs, and expenses). For example, while conventional leaf layout generators have shortcomings, the system can ignore a net length during placement optimization for transistors that are connected to external nets to increase the likelihood for other transistors to snap together and to increase an overall routability of the leaf cell. That is, the overall increased routability relates to using highly effective "local interconnects," when placing components close to each other, thereby leaving the standard metal resources for other connections.

Figure 1:
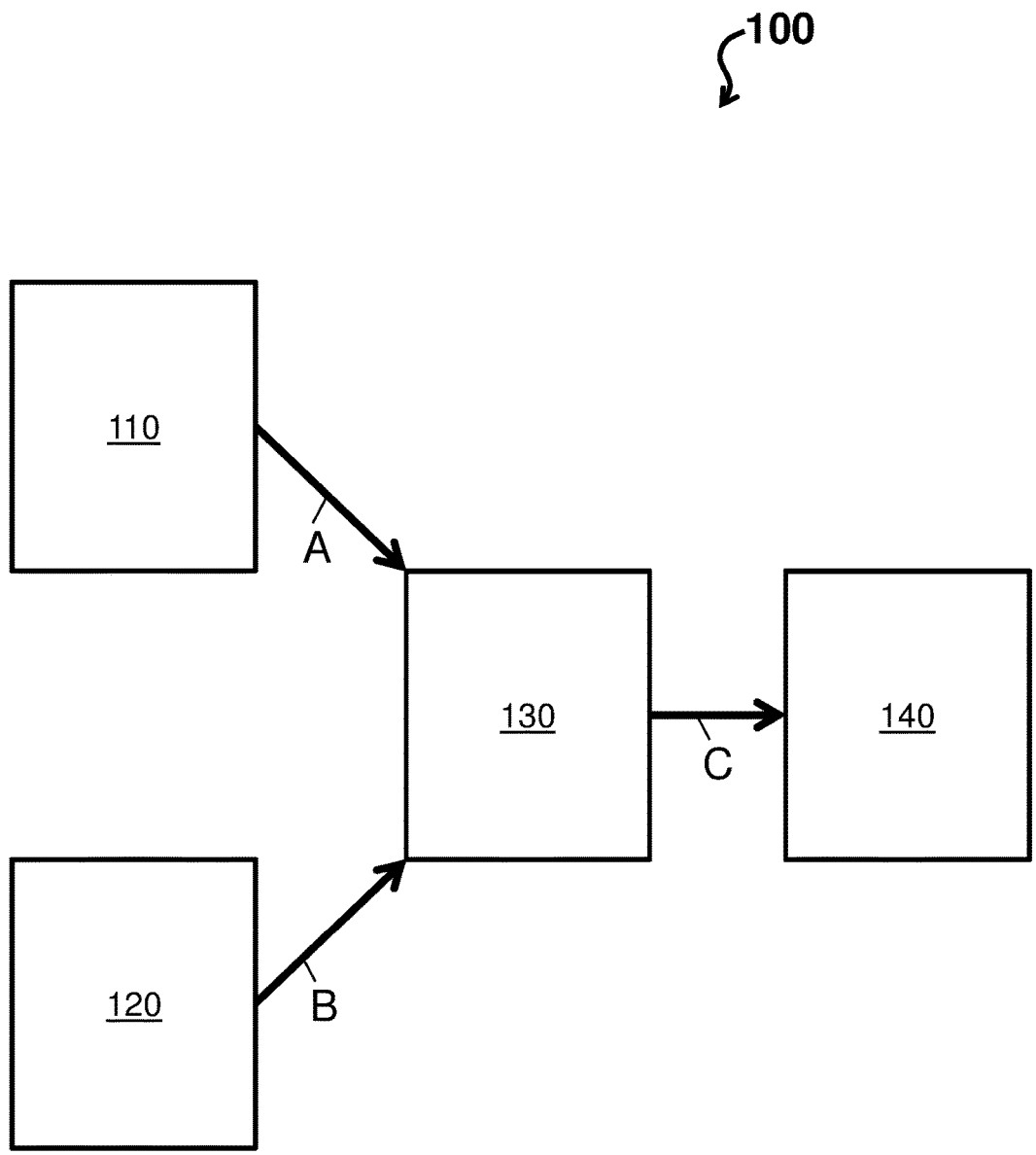
FIG. 1 depicts a communication schematic of a system in accordance with one or more embodiments.

Turning now to FIG. 1, a communication schematic 100 of a system is depicted in accordance with one or more embodiments. The system can be an electronic, computer framework comprising and/or employing any number and combination of computing devices and networks utilizing various communication technologies, as described herein (e.g., as described in FIG. 5), that can be easily scalable, extensible, and modular, with the ability to change to different services or reconfigure some features independently of others.

The system can comprise a processor and a memory. The memory can store a schematic 110, control settings 120, and/or a placement generator 130. The circuit schematic 110 comprises a representation of an electrical circuit (e.g., semiconductor circuit) detailing components and interconnections of the electrical circuit. The control settings 120 can comprise placement requirements. The placement generator 130 utilizes the circuit schematic 110 and the control settings 120 while executing a placement optimization that generates a layout 140 of the electrical circuit. The control settings 120 can also comprise technology dependent settings or constraints (e.g. gap requirements for different field-effect transistors (FETs) sizes). The layout 140 details a physical arrangement of the components and interconnections of the electrical circuit.

The representation of the circuit schematic 110 can comprise a level hierarchy detailing cells and nets of each level as the level hierarchy is ascended. The circuit schematic 110 can be in graph, chart, table, or picture form. In general, the presentation of the interconnections between the components in the circuit schematic 110 does not necessarily correspond to physical arrangements in a finished device. In a non-limiting embodiment, the circuit schematic 110 comprises a netlist describing a connectivity of an electronic circuit by detailing a list of terminals ("pins") of the components in the electrical circuit and a list of electrical conductors that interconnect the pins. A net is a conductor that interconnects two or more component terminals. A cell comprises one or more nets within a level of the electrical circuit.

The standard cell libraries comprise a collection of low-level electronic logic functions, such as AND, OR, INVERT, flip-flops, latches, and buffers, of a fixed height, which enables them to be placed in rows, easing the placement optimization. The placement requirements of the control settings 120 can comprise area, interconnection length (which equates to timing), limited metal resources, electromigration requirements, external connection requirements, and other characteristics.

For instance, characteristic defined by the control settings 120 can include a net-weight (herein referred to a netWeight) and a net-length (herein referred to a netLength). NetWeight is a parameter that defines how important it is to reduce the netLength in relation to other netLengths. NetLength is a characteristic that defines a physical wire length of the interconnections of the electrical circuit (e.g., an interconnection length). The higher the netWeight, the more the components (e.g., transistors or FETs) of a particular net are pulled closer together (during placement). For instance, the higher the netWeight, the more the transistors are pulled together to shorten the netLength so as to decrease a capacity of the net and improve timing. Physical closeness of the components of the electrical circuit shortens the netLength between the components. As the netLength decreases for the particular net, the capacity of the net is reduced and timing is improved for that particular net. For example, the higher the netWeight, the stronger the FETs get pulled together. Note, in one or more embodiments, a default netWeight for all nets can be set to one (1). Also, note that in one or more embodiments the netWeight does not affect a gate-to-gate net-length (alignment of PMOS and NMOS FET gates). A connection to power/ground has no netWeight. In accordance with one or more embodiments, a netWeight assigned to an internal net (of a cell) can be considered an exclusive internal weight that applies only to a cell of an electrical circuit, thereby neglecting nets external to that cell.

The placement optimization executed by the placement generator 130 can comprise one or more operations, at a conclusion of which generate a layout 140. Note that the placement optimization of the placement generator 130 and the one or more operations thereof can be considered processor-implemented. For instance, the placement generator 130 can comprise computer readable program instructions executable by the processor of the system to perform the placement optimization 130 and the one or more operations thereof. In this way, the placement generator 130 is necessarily rooted in the processor of the system to perform proactive operations to snap together and to increase an overall routability of the components of the electrical circuit defined by the circuit schematic 110. An example placement optimization of the placement generator 130 to generate the layout 140 will now be described with respect to FIG. 2.

Figure 2:
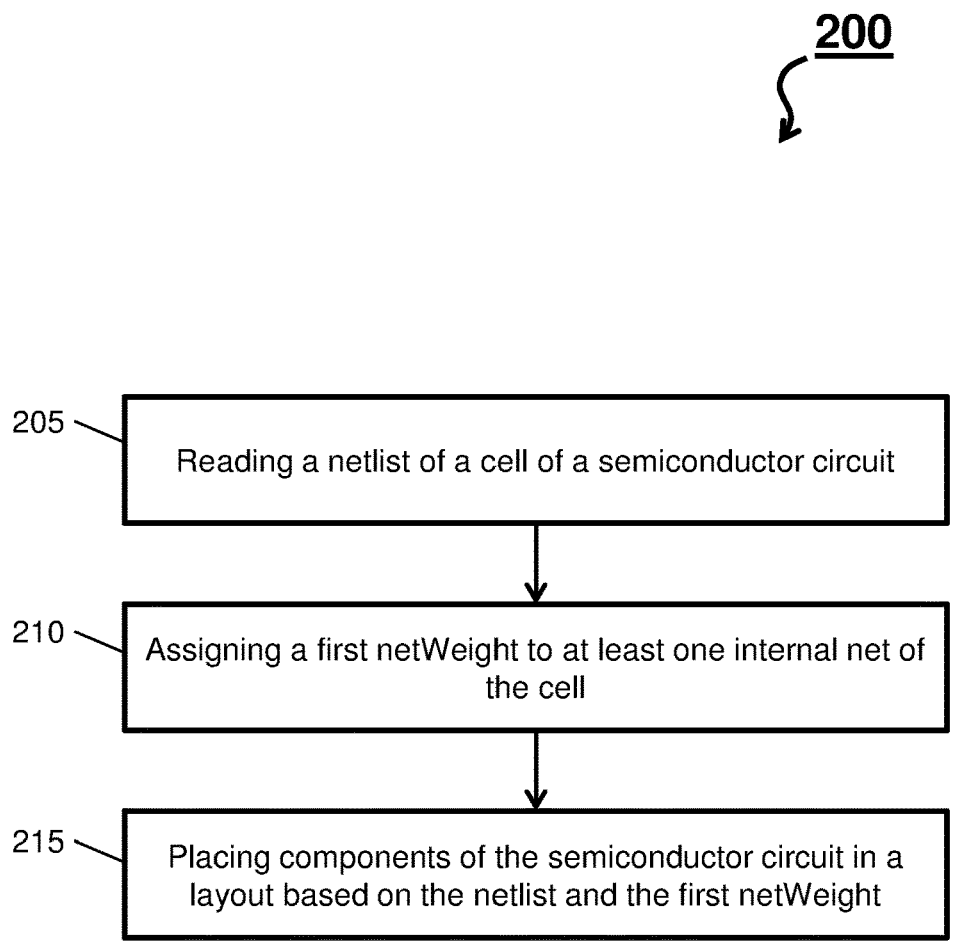
FIG. 2 depicts a process flow of a system in accordance with one or more embodim

FIG. 2 depicts a process flow 200 of the system for automatically generating the layout 140 of the cell of the electrical circuit (e.g., semiconductor circuit) in accordance with one or more embodiments. Initially, the placement generator 130 receives the circuit schematic 110 and the control setting 120 from the memory (e.g., as represented by arrows A and B). As shown at block 205 of the process flow 200, a netlist of the cell is read. For example, the netlist is read by the processor of the system executing the placement generator 130 with the placement generator 130 actively accessing the circuit schematic 110 from the memory of the system or by a transmission of the circuit schematic 110 from the memory to the placement generator 130. The netlist can be included in the circuit schematic 110. The netlist can include a description of internal electrical nets connecting the components of the cell with each other. The internal electrical nets can be part of a leaf cell level of the semiconductor circuit. While reading the netlist, the placement generator 130 processes/determines the components and interconnections of one or more nets of the semiconductor circuit.

At block 210, a first netWeight is assigned to at least one internal net of the internal electrical nets. The first netWeight can be an exclusive internal weight as described herein. An example of assigning the first netWeight can include when the first netWeight is part of the control settings 120 and a designer of a leaf cell (who knows what nets are timing critical and which one are not) designates a value to that first netWeight. Further, when the designer forgoes assigning netWeight values, a default value of one (1) is automatically assigned to the first netWeight. Additionally, embodiments here can distinguish between internal and external nets, and therefor set corresponding internal and external netWeights (e.g., the external nets are set to 0).

Note that the first netWeight corresponds to a relative cost, such as a higher a netWeight the higher is a cost for a netLength. For instance, the placement generator 130 can utilize the control settings 120 to determine which weights are assigned to which internal electrical nets. In one or more embodiments, the weight is set to zero (0). That is, a penalty (weight) for wires is reduced to zero.

Next, the placement generator 130 performs placement optimization for the components of the circuit schematic 110 in accordance with the control settings 120. As shown at block 215 of the process flow 200, the components of the cell are placed based on the netlist and the first netWeight to generate the layout of the cell of the semiconductor circuit. For instance, the components can be placed by the placement generator 130 in an area of the semiconductor circuit based on the netlist and the first netWeight to generate the layout 140 of the cell of the electrical circuit.

For instance, the placement optimization by the placement generator 130 can utilize the placement requirement and the standard cell libraries of the control settings 120 in conjunction with the circuit schematic 110 to determine a structural optimization based on one or more rubrics. The one or more rubrics can include 1) optimizing a cell size and stack PMOS and NMOS FETs; 2) aligning gates to reduce connecting wire lengths, such as aligning gates of NMOS and PMOS that are connected to a same net (thus PMOS and NMOS FETs are optimally stacked above each other); 3) optimizing wire length even for input signals; and 4) optimizing a total internal net length of the cell (e.g., a length of the at least one internal net is weighted according to the netWeight). It will be appreciated that the placement generator 130 can neglect netLengths for PMOS and NMOS FETs connected to nets during the placement optimization, which will assist with routability since likelihood that internal nets get routed on lower levels not consuming upper metal resources is increased (e.g., based on the use of an exclusive internal weight).

Figure 3:
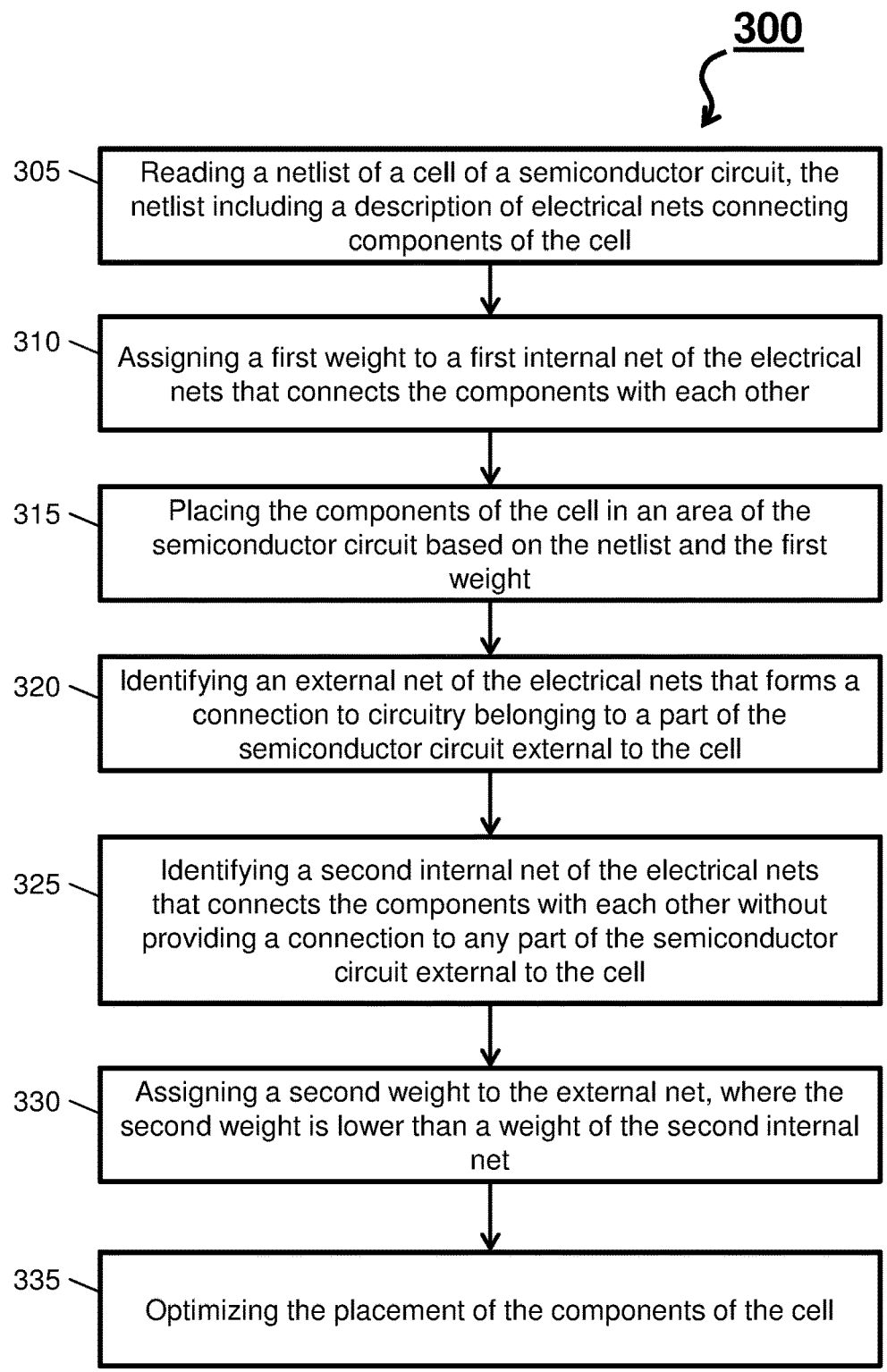
FIG. 3 depicts a process flow of a system in accordance with one or more embodiments.
Figure 4:
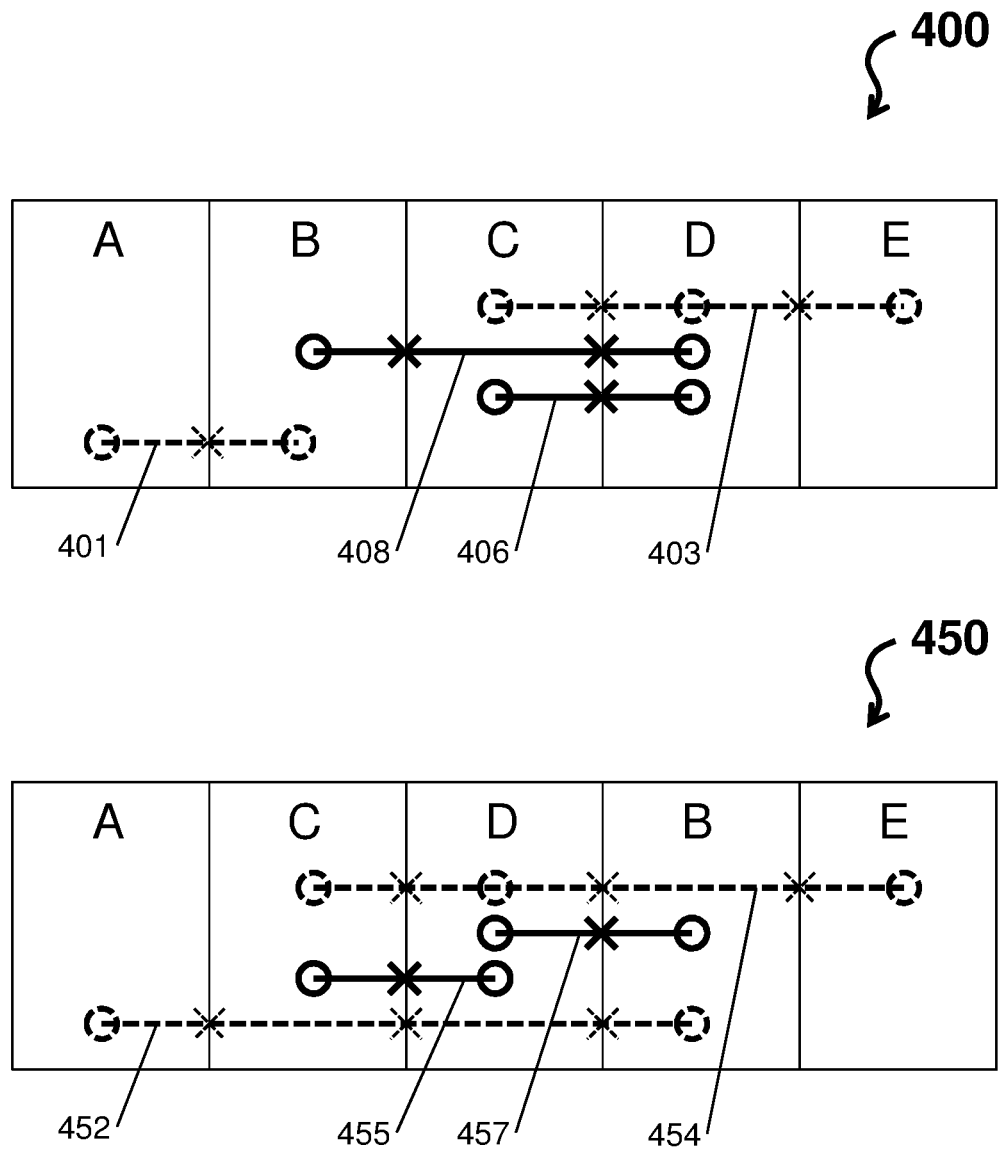
FIG. 4 depicts a wiring advantage of a system in accordance with one or more embodiments.

Turning now to FIGS. 3-4, an example placement optimization of the placement generator 130 to generate the layout 140 will now be described in accordance with one or more embodiments. FIG. 3 depicts the example placement optimization as a process flow 300 with respect to a semiconductor circuit. The process 300 begins at block 305 where a netlist of a cell of a semiconductor circuit is read. The netlist can include a description of electrical nets connecting components of the cell. At block 310, a first netWeight is assigned to a first internal net of the internal electrical nets. At block 315, the components of the cell are placed in an area of the semiconductor circuit based on the netlist and the first netWeight (to produce a first layout 400 of FIG. 4).

FIG. 4 depicts a wiring advantage of the system in accordance with one or more embodiments. As shown, the first layout 400 includes components A, B, C, D, and E of a cell; two external wirings 401 and 403 (depicted by dashed lines, circles, and Xs); and two internal/local wirings 406 and 408 (depicted by the solid lines, circles, and Xs). The circles indicate a pin where the wirings 401, 403, 406, and 408 connect to the components A, B, C, D, and E. The Xs indicate a wire distance between pins. A total netLength of the two external wirings 401 and 403 is 3. A total netLength of the two internal/local wirings 406 and 408 is 3. Note that the wiring of component A to the component B via the external wiring 401 can profit from internal/local wiring as these components abut each other.

The process 300 then proceeds to block 320 where an external net of the electrical nets that forms a connection to circuitry belonging to a part of the semiconductor circuit external to the cell is identified. At block 325, a second internal net that connects the components without providing a connection to any part of the semiconductor circuit external to the cell is identified. Note that the second internal net can be the same as the first internal net of block 310. At block 330, a second netWeight is assigned to the external net. The second netWeight is lower than a weight of the second internal net. Note that, in the case where the second internal net is the same as the first internal, the second weight is lower than the first weight. At block 335, the placement of the components of the cell is optimized. The optimization of block 335 can utilize the second netWeight. As an example of a result of the optimization of block 335, a second layout 450 of FIG. 4 is provided, which is an optimized first layout).

As shown, the second layout 450 includes components A, B, C, D, and E of the cell; two external wirings 452 and 454 (depicted by dashed lines, circles, and Xs); and two internal/local wirings 455 and 457 (depicted by the solid lines, circles, and Xs). The circles indicate a pin where the wirings 452, 454, 455, and 457 connect to the components A, B, C, D, and E. The Xs indicate a wire distance between pins. A total netLength of the two external wirings 452 and 454 is 6. A total netLength of the two internal/local wirings 455 and 457 is 2. Note that the placement optimization has increased the total netLength within the cell from 6 to 8, while the internal netLength was reduced from 3 to 2. In this way, by neglecting externally connected netLengths, better cell placements are found that allow for local interconnect solutions for internal wires. A side effect is that the number of connection spots for eternal net may increase, which helps routability at the next level.

Figure 5:
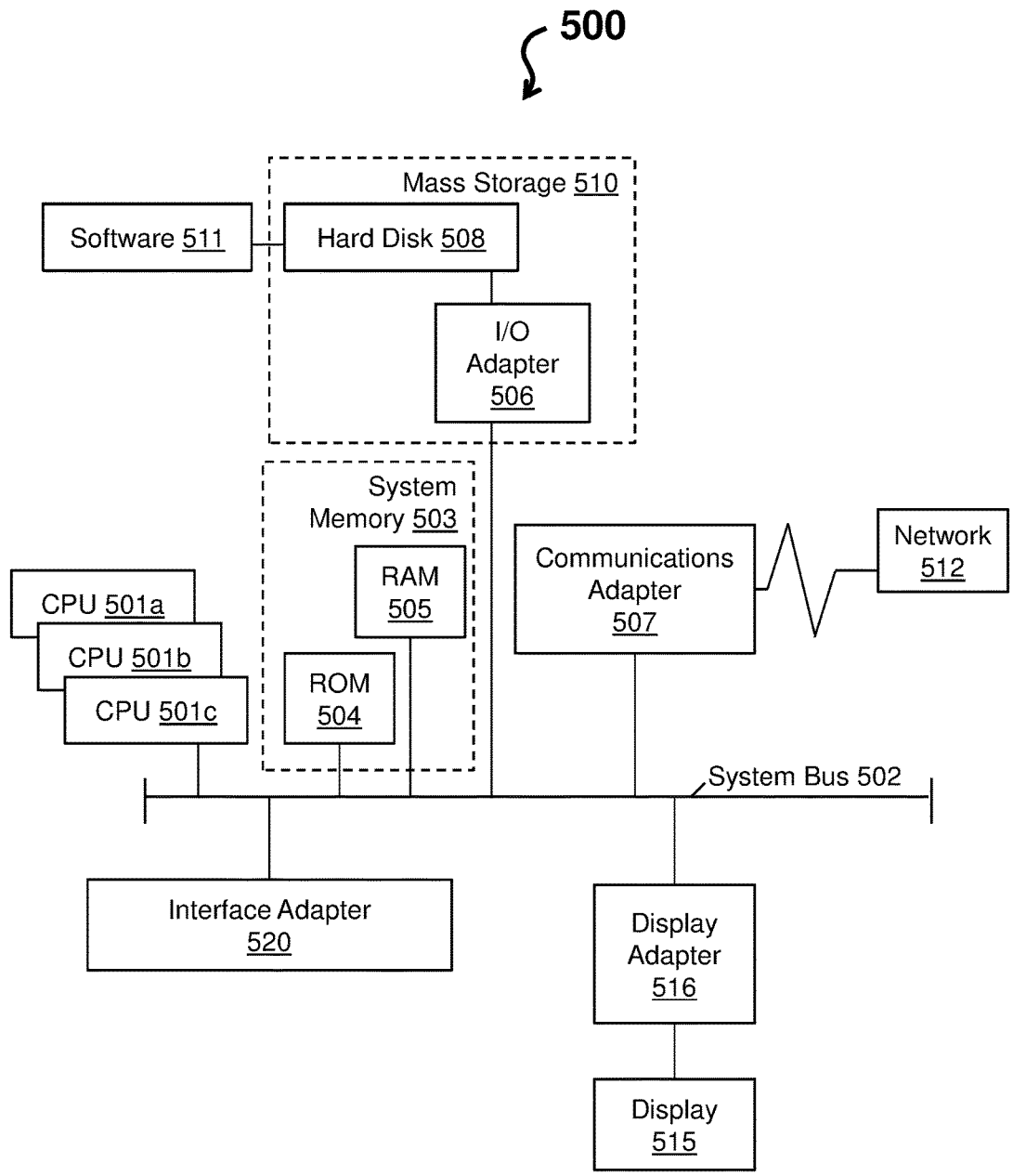
FIG. 5 depicts a system in accordance with one or more embodiments.

FIG. 5 depicts a system 500 in accordance with one or more embodiments. The system 500 is an example of the system described with respect to FIGS. 1-4 and is not intended to be limiting. The system 500 has one or more central processing units (CPU(s)) 501a, 501b, 501c, etc. (collectively or generically referred to as processor(s) 501). The processors 501, also referred to as processing circuits, are coupled via a system bus 502 to system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the system 500. The RAM is read-write memory coupled to the system bus 502 for use by the processors 501.

FIG. 5 further depicts an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510. Software 511 for execution on the system 500 may be stored in the mass storage 510. The mass storage 510 is an example of a tangible storage medium readable by the processors 501, where the software 511 is stored as instructions for execution by the processors 501 to cause the system 500 to operate, such as is described herein with reference to FIGS. 2-3. Examples of computer program product and the execution of such instruction is discussed herein in more detail. Referring again to FIG. 5, a communications adapter 507 interconnects the system bus 502 with a network 512, which may be an outside network, enabling the system 500 to communicate with other such systems. A display (e.g., screen, a display monitor) 515 is connected to the system bus 502 by a display adapter 516, which may include a graphics controller to improve the performance of graphics intensive applications and a video controller. In one embodiment, the adapters 506, 507, and 516 may be connected to one or more I/O buses that are connected to the system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 502 via an interface adapter 520 and the display adapter 516. A keyboard, a mouse, a speaker, etc. can be interconnected to the system bus 502 via the interface adapter 520, which may include, for example, a Super I/O chip integrating multiple device adapters into a single integrated circuit.

Thus, as configured in FIG. 5, the system 500 includes processing capability in the form of the processors 501, and, storage capability including the system memory 503 and the mass storage 510, input means such as the keyboard and the mouse, and output capability including the speaker and the display 515. In one embodiment, a portion of the system memory 503 and the mass storage 510 collectively store an operating system, such as the z/OS or AIX operating system from IBM Corporation, to coordinate the functions of the various components shown in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for automatically generating a layout of a cell of a semiconductor circuit by minimizing a gate-to-gate net length of the cell, comprising:

reading, by a processor, a netlist of the cell, the netlist including a description of internal electrical nets connecting electrical components of the cell with each other;

assigning, by the processor, an exclusive internal weight to at least one internal net of the internal electrical nets;

placing, by the processor, the electrical components in an area of the semiconductor circuit based on the netlist and the weight to generate the layout of the cell of the semiconductor circuit; and provide the layout of the cell to a production process for producing the semiconductor circuit, wherein the weight corresponds to a probability that electrical components respective to the at least one internal net are placed close to each other, wherein the method comprises assigning a second weight to at least one external net that is lower than the weight of the at least one internal net, wherein placing of the electrical components comprises optimizing a total internal net length of the cell, where a length of the at least one internal net is weighted according to the weight.

2. The processor-implemented method of claim 1, wherein the method comprises identifying at least one external net that forms an electrical connection to circuitry belonging to a part of the semiconductor circuit external to the cell.

3. The processor-implemented method of claim 1, wherein the method comprises identifying at least one internal net that connects without providing an electrical connection to any part of the semiconductor circuit external to the cell.

* * * * *